United States Patent [19]

Etani

[11] 4,039,448

[45] Aug. 2, 1977

[54] FILTER WITH AN OPEN-CELL ELASTOMERIC FOAM

[76] Inventor: Kenji Etani, W. Meadow Road, West Townsend, Mass. 01474

[21] Appl. No.: 655,128

[22] Filed: Feb. 4, 1976

Related U.S. Application Data

[63] Continuation-in-part of Ser. No. 518,077, Oct. 25, 1974, Pat. No. 3,947,362, which is a continuation-in-part of Ser. No. 419,042, Nov. 26, 1973, abandoned.

[51] Int. Cl.² .............................................. B01D 29/06
[52] U.S. Cl. .................................. 210/42 R; 210/169; 210/323 T; 210/494 R; 210/496; 210/497.1
[58] Field of Search ................. 55/522; 210/169, 206, 210/209, 323 T, 493 B, 494, 496, 497 R, 497.1, 42 R

[56] References Cited

U.S. PATENT DOCUMENTS

| | | | |
|---|---|---|---|
| 2,463,929 | 3/1949 | West | 210/494 X |
| 2,883,058 | 4/1959 | Jaume | 210/494 X |
| 3,139,402 | 6/1964 | Armbrust | 210/169 X |
| 3,173,865 | 3/1965 | Bosico | 210/169 |
| 3,212,242 | 10/1965 | Florine | 55/522 |
| 3,224,592 | 12/1965 | Burns et al. | 210/494 X |
| 3,253,715 | 5/1966 | Painter et al. | 210/496 X |
| 3,321,088 | 5/1967 | Williamitis | 210/497 R |
| 3,360,131 | 12/1967 | Witkowski | 210/496 X |
| 3,859,215 | 1/1975 | Lang et al. | 210/169 |
| 3,947,362 | 3/1976 | Etani | 210/497 R |

FOREIGN PATENT DOCUMENTS

| | | | |
|---|---|---|---|
| 884,480 | 12/1961 | United Kingdom | 210/496 |

*Primary Examiner*—Thomas G. Wyse
*Assistant Examiner*—R. G. Mukai
*Attorney, Agent, or Firm*—Morse, Altman, Oates & Bello

[57] ABSTRACT

A filter for the water of swimming pools or the like comprises: a cylindrical body having, coaxially, an inner hollow surface and an outer peripheral surface; a pair of opposed disks that seal the ends of the body; and an axial fitting, that generally is spaced from the hollow surface and that connects the disks; the direction of flow being through the fitting, to the hollow surface, through the body and from the peripheral surface. Preferably, the cylindrical body is formed by the overlapping convolutions of an elastomeric foam sheet and the filter is incorporated in a system that employs a coagulant for enhancing filtration efficiency and a caustic for enabling filter cleansing.

2 Claims, 3 Drawing Figures

FILTER WITH AN OPEN-CELL ELASTOMERIC FOAM

CROSS REFERENCE TO RELATED APPLICATION

The present application is a continuation-in-part of copending application entitled Filter With Open-celled Elastomer Foam, Ser. No. 518,077, filed Oct. 25, 1974, now Pat. No. 3,947,362, which in turn is a continuation-in-part of copending application entitled Filter With Open-celled Elastomer Foam, Ser. No. 419,042, filed Nov. 26, 1973 and now abandoned.

BACKGROUND OF THE INVENTION

1. Field of the Invention

The present invention relates to filtration products, processes and systems and, more particularly, to the utilization of an open cell, elastomeric foam as a filter medium for capturing the suspended constituents of a transmitted liquid to provide a clarified filtrate.

2. Description of the Prior Art:

Difficulties have been encountered in utilizing an elastomeric foam as an aqueous liquid filter medium because of its tendency to deform and finally to collapse as a result of compression forces generated by the flow itself and/or by clogging of upstream regions.

SUMMARY OF THE INVENTION

The present invention takes advantage of the fact that, although an elastomeric foam is readily compressible, it is difficulty extensible. It has been found that while an elastomeric foam is transmitting water, if the shape of its upstream surface is maintained, collapsing of the foam body can be avoided. It has also been found, that if the prefilt is fed at the center of an elastomer foam and flows through the foam in a radial manner, the foam itself essentially maintains its original shape during filtration, since the forces at any point on the same radius are equal and cancel out each other with respect to the axis. The primary object of the present invention is to provide filter products, processes and systems, characterized by: a cylindrical body having, coaxially, an inner hollow surface and an outer peripheral surface; a pair of opposed disks that seal the ends of the body; and an axial fitting, that generally is spaced from the hollow surface and that connects the disks; the direction of flow being through the fitting, to the hollow surface, through the body and from the peripheral surface. Preferably, the cylindrical body is formed by the overlapping convolutions of an open cell elastomeric foam sheet and the filter is incorporated in a system that employs a coagulant for enhancing filtration efficiency and a caustic for enabling filter cleansing. The arrangement is such that forces within the foam body tend to maintain original shape and to deepen particle penetration.

Other objects of the present invention will in part be obvious and will in part appear hereinafter.

The invention accordingly comprises the products, processes and systems, together with their parts, steps, components and interrelationships, which are exemplified in the following detailed disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings, wherein.

DETAILED DESCRIPTION

Figure 1:
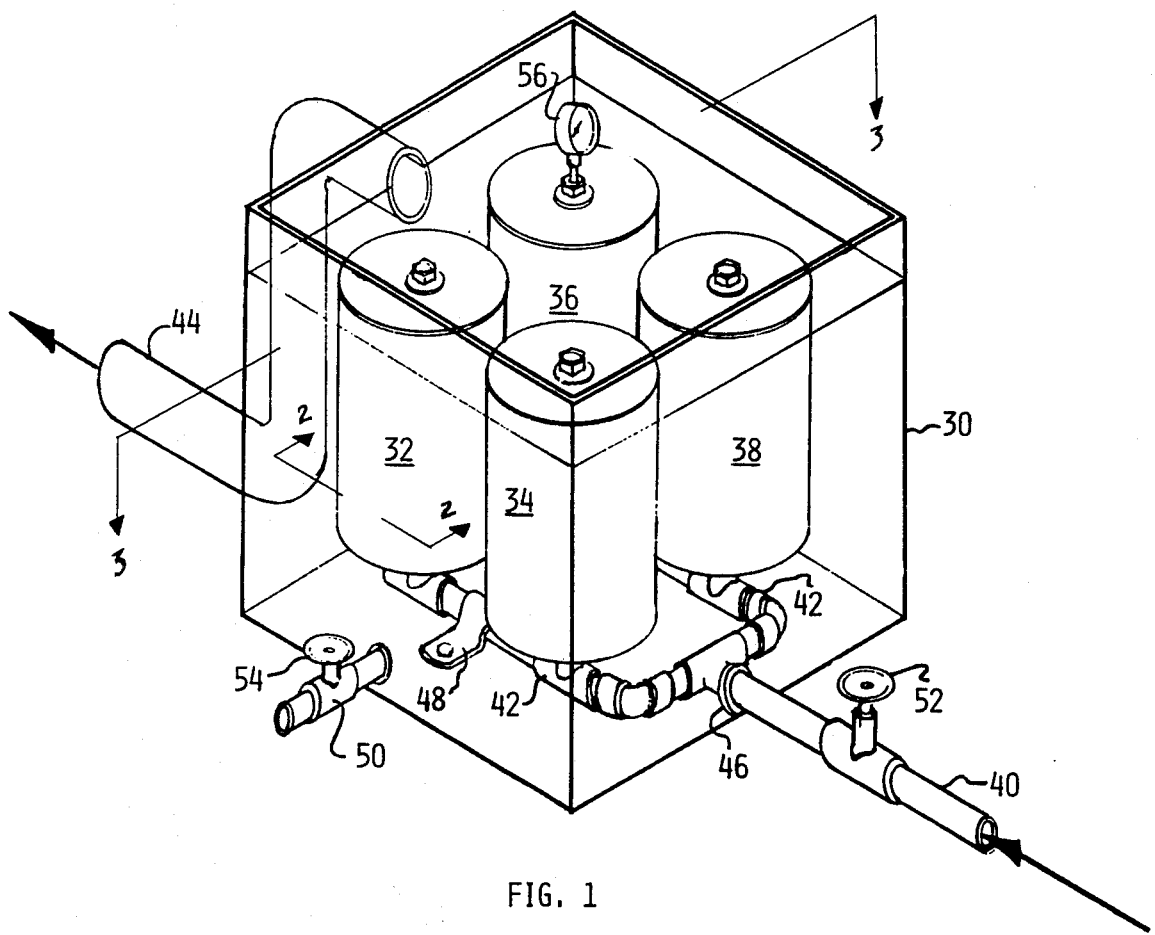
FIG. 1 is a perspective view of a system embodying the present invention.
Figure 2:
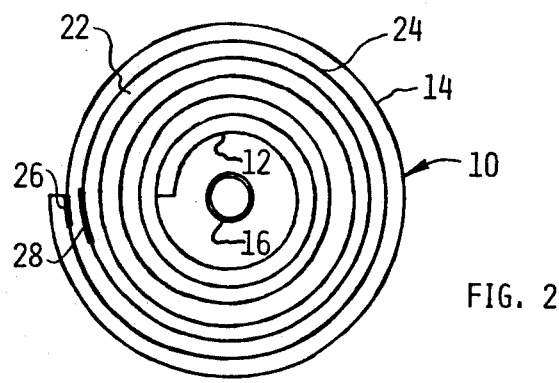
FIG. 2 is a cross-sectional view of a filter of FIG. 1, taken substantially along the line 2—2 of FIG. 1.
Figure 3:
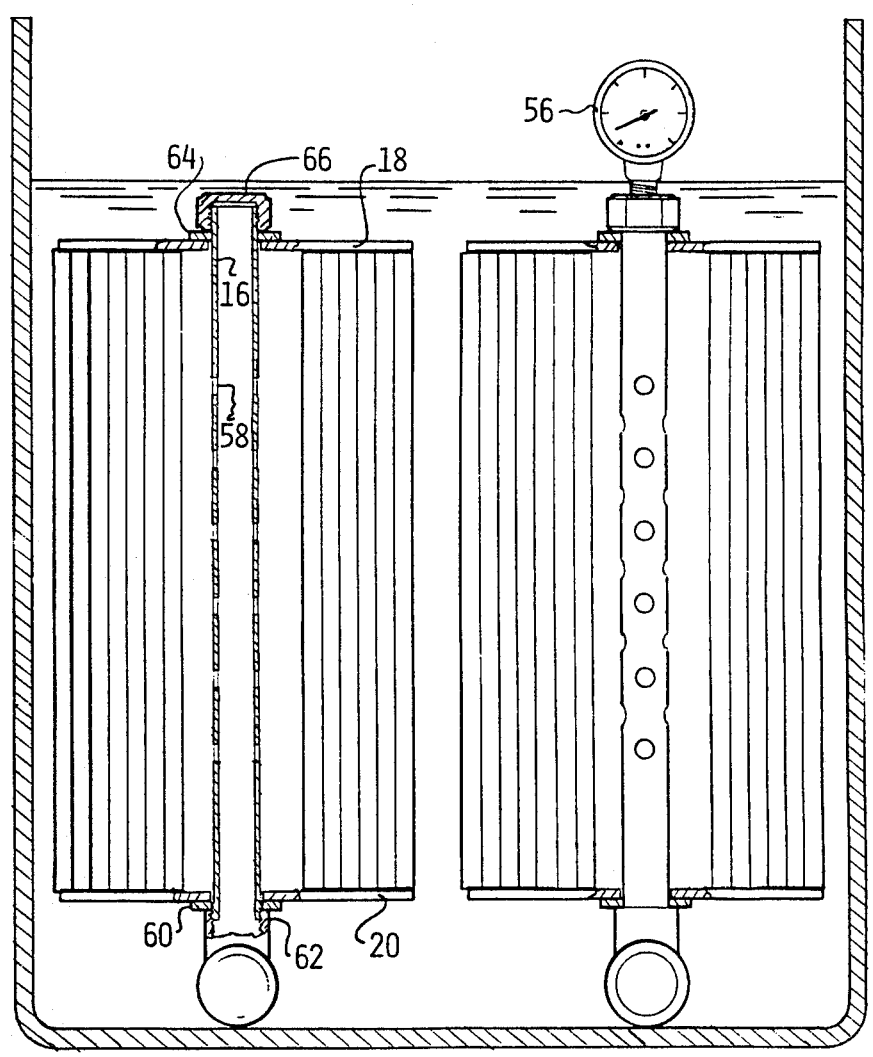
FIG. 3 is a cross-sectional view, taken substantially along the line 3—3 of FIG. 1.

Generally, the illustrated filtration system comprises a single filter or multiple filters, the number being determined by desired capacity exemplified as four filters in FIG. 1, each comprising, as shown in FIG. 2 and 3: a cylindrical elastomeric foam body 10 that is characterized by open cells, which generally range from 10 to 400 in number per linear inch, and that is capable of transmitting water therethrough from a hollow inlet surface 12 to a peripheral outlet surface 14; a dimensionally stable inlet fitting 16, which is disposed within and spaced from hollow inlet surface 12; and a pair of opposed disks 18, 20, which are cemented to the opposite ends of foam body 10. Preferably, foam body 10 is formed by the overlapping convolutions 24 of an elastomeric foam sheet 22, by which the overlapping convolutions 24 of an interface are defined. These overlapping convolutions, as well as peripheral surface 14, hollow surface 12 and fitting 16, are substantially coaxial. As shown, the outer three convolutions of sheet 22 are cemented together by single lines of cement 26, 28, which extend paraxially and continuously from one end of body 10 to the other. Typically, lines of cement 26, 28 are applied as an adhesive containing a rubber, particularly a nitrile or chloroprene (Neoprene) rubber, dispersed in an organic solvent such as naphtha or toluol. As shown, fitting 16 is an apertured pipe of smaller diameter than hollow surface 12 so that, in essence, it is spaced from hollow surface 12. In various arrangements, the water either is forced outwardly through the foam body by a pressure pump at fitting 16 or is drawn outwardly through the foam body by a suction pump at peripheral surface 14.

In the preferred embodiment, the elastomeric foam is selected from the class consisting of urethane polymers and vinyl polymers. Typically, the open cell elastomeric foam is produced at present either by chemical foaming or physical foaming of vinyl or urethane polymers, for example: a vinyl polymer such as polyvinyl chloride; or one of two types of polyurethane, for example, polyether based and polyester based. Preferably, the 25 percent indentation load deflection (ILD) value of the elastomeric foam is in the range of 1–200, the indentation load deflection value being pounds-force per 50 square inch required for 25 percent indentation as per ASTM D1564-71. Typically, the fitting is composed of a polymer such as polystyrene, polyethylene or polyvinyl chloride or a metal such as steel or aluminum. Typically, the cement bond between disks 18, 20 and the ends of body 10 and between convolutions 22 are applied as an adhesive containing a rubber, particularly a nitrile or chloroprene (Neoprene) rubber, dispersed in an organic solvent such as naphtha or toluol.

In FIG. 1, the illustrated filtration system is shown as comprising a container 30, within which are located four vertically oriented filters 32, 34, 36, 38 of the type shown in transverse crosssection in FIG. 2 and in longitudinal cross-section in FIG. 3. At the bottom of container 30, an inlet 40 feeds water through conduits 42 to the lower ends of fittings 16 of the four filters. In the case of each filter, water flows from its fitting 16 outwardly through its elastomeric foam body 10 and into container 30, from which it flows through an outlet 44 at the top of container 30. A seal 46 prevents escape of water from container 30 in the vicinity of inlet 40. Conduits 42, and consequently filters 32, 34, 36, 38, are fixed within container 30 by clamps, one of which is shown at 48. An outlet 50 is provided at the bottom of container 30 for flushing the container when desired. Inlet 40 and outlet 50 are controlled by valves 52, 54, respectively. A meter 56, at the upper extremity of one of the filters, communicates with its fitting 16 in order to indicate internal pressure. As shown in FIG. 3, in the present embodiment, each fitting 16 is a pipe having apertures 58, which are located within body 10, and extremities, which project through central openings in disks 18, 20. At its lower extremity, each pipe is sealed to disk 20 by a rubber gasket 60, which is clamped against the disk by a shoulder 62. At the upper extremity, each pipe is sealed to disk 18 by a rubber gasket 64, which is clamped against the disk by a threaded cap 66, which is turned onto the threaded extremity of fitting 16.

In one embodiment of the present invention, in order to enhance the trapping of fine suspended particles, a coagulant, such as alum (aluminum sulfate), is added to the water being filtered. When the water containing the coagulant, added at constant dosage prior to filtration, passes through the filter body, the flocculated coagulant, and the fine particles it contains, is strained from the water.

The entire body can be removed easily from the fitting for washing. In one such process, the foam body is immersed in water or soapy water, or in a trisodium phosphate solution in a laundry tub and squeezed in all directions to release captured dirt. It has been found that effective cleaning of the filter without deleterious effects on the polyurethane foam, particularly polyether polyurethane foam, is accomplished with an alkali metal hydroxide solution, e.g. sodium hydroxide (caustic soda) or potassium hydroxide solution, the solid content being no greater than ten percent by total weight. The alkali metal hydroxide solution dissolves and decomposes hair, fine debris, algae and other organic matter trapped by the filter without damaging the polyurethane foam. After detergent washing or caustic soda cleaning, the filter is rinsed by immersion in water. In another such process, the filter is cleansed by flowing the caustic fluid through the filter without removing it from its fitting.

Example And Operation

Four filter systems of the type shown in FIGS. 1, 2 and 3 were tested in a 7,000-gallon swimming pool containing water from a pond from which test water is drawn. For these tests, the pool was filled with stagnant water from the pond, and after each test was completed, the clean pool water was emptied back into the pond and the pool was filled again with pond water for continued testing. The turbidity of the pond water depended on seasonal temperature changes and the concentration of algae present, and the visibility within the water ranged from 1 foot to 6 feet. The cylindrical body of each filter was composed of polyether polyurethane foam having approximately 60 ppi and having a 40 ILD value at 25% indentation. Each body had an 8 inch diameter and a twelve inch height made by rolling up a ½ inch thick polyurethane sheet of about 90 inch length. The sheet was glued at two locations, i.e., one location was at the extreme end and the other location was one convolution inside the filter as shown in FIG. 2. The axial opening of the cylindrical body was about 2-½ inch in diameter. The disk-shaped plastic end plates having 7-¾ inch diameter, 1-1/16 inch diameter center hole and one-eighth inch thickness were cemented to the flat end surfaces of the cylindrical foam. The plastic feed tube which accepts the filter body through the two holes in the plastic end plates had a length of 13 inches and an outside diameter of 1 inch. Each feed tube had 48 perforations of 5/16 inch diameter distributed along a 8-¼ inch length. Once the pool was filled with pond water, a chlorinating compound, e.g., calcium hypochlorite, was added until the water tester read 1 – 3 ppm of total chlorine. The pH was maintained at about 7.2 to 8.0 during the tests. A coagulant, e.g., alum (aluminum sulfate), then was fed constantly into the influent at a skimmer just before the pump by a simple dosage device. No residence time was allowed for floc formation. The total filtration rate was approximately 40 - 50 gallons/minute. From the beginning of testing, the effluent was very clear and the pool water was clarified within five hours. In this period, alum consumption was about 100 grams at a water temperature of 48° F. The pressure within the filters increased from 0.2 lb/sq in to 0.5 lb/sq in. After 18 – 24 hours, the water was crystal clear. The test was stopped, and the pool water was emptied back into the pond. Testing was resumed and the pool was refilled with pond water. This test was repeated six times in the same manner without cleaning the filter between tests. During this time, the pressure gage indicated from 0.2 lb/sq in to 2.3 lbs/sq in. The cylindrical filter medium began to ballon slightly after several testings. After such extensive testing, the filter was cut open, revealing that all surfaces throughout the inside and the inside of the foam layers were clogged with dirt, slightly more severly upstream and less downstream. When the water in the container was drained, the heavy water-ladened filter medium tended to settle by gravitational force, and when water was re-introduced to the container, the upper portion of the filter medium tended to float because of air in the medium and to recover its original shape in the water. Before the container was completely filled and the water began to overflow, the axial opening in the foam filled with water and a major portion of the air in the opening escaped through the center hole of the top end plate until the end plate and rubber gasket became sealed. This affords a very convenient time for cleaning the filter medium with a caustic soda solution, since the solution filled the axial opening first and flowed out radially before the container filled with the solution. Without removing the filter from the container, the filters were rejuvenated in the following sequence:

a. The influent was turned off when the filter medium began to be clogged (the pressure reached about 2 lbs/sq in gage).

b. The water in the container was drained.

The influent was turned on at a reduced flow rate.

d. Caustic soda was fed into the skimmer (could also be fed at another convenient place).

e. When the entire filter medium was submerged in the caustic soda solution, the influent was turned off and the caustic soda solution was maintained inside the filter container for a short period, e.g., 10 to 30 minutes, to allow the caustic soda to work. The water was very cloudy with fine particles released from the medium.

f. The dirty solution was then drained to waste (the solution can be neutralized in the container before disposal, if necessary).

g. The container was filled with fresh water which was again drained to waste.

h. Above (g) was repeated a few times. Even without neutralization with acid, all the alkaline solution was removed after 2 - 3 rinsings.

The amount of caustic soda used was nominal (about 10 grams per filter medium), and the volume of water required for this cleaning was much less than the volume that would be required for ordinary backwashing operations in a sand filter. After caustic soda cleaning, the pressure drop was measured. It was reduced from 2.3 lbs/sq in to 1.3 lbs/sq in gage. Successful filtration was carried out after the rejuvenation.

The present invention thus provides a filter capable of utilizing an open cell, elastomer foam as a filter medium for prolonged periods. Since certain changes may be made in the present disclosure without departing from the scope of the invention herein involved, it is intended that all matter shown in the accompanying drawings and described in the foregoing specification be interpreted in an illustrative and not in a limiting sense.

What is claimed is:

1. A filter for water, said filter comprising:
   a. a cylindrical body having, coaxially, an inner hollow surface and an outer peripheral surface;
   b. a pair of opposed end plates sealing the ends of said body; and
   c. an axial fitting that substantially is spaced from the hollow surface and that connects said end plates;
   d. said body being composed of an elastomeric foam characterized by open cells which range from 10 to 400 pores per linear inch; e. said cylindrical body being composed of spiral convolutions including two outer convolutions of a sheet of said elastomeric foam;
   f. at least said two outer convolutions being bonded to each other by a line of cement extending substantially from one end of said body to the other;
   g. said end plates being bonded to the ends of said body by cement;
   h. said elastomeric foam being composed of a material that is selected from the class consisting of urethane polymers and vinyl polymers and has a 25 percent indication load deflection value in the range of 1 to 200 pounds-force per 50 square inches.

2. A filtration process comprising flocculating a water supply to be cleansed by dispersing a coagulant therein and flowing the flocculated water supply into a filter comprising:
   a. a cylindrical body having, coaxially, an inner hollow surface and an outer peripheral surface;
   b. a pair of opposed end plates sealing the ends of said body; and
   c. an axial fitting that substantially is spaced from the hollow surface and that connects said end plates;
   d. said body being composed of an elastomeric foam characterized by open cells which range from 10 to 400 pores per linear inch;
   e. said cylindrical body being composed of spiral convolutions including two outer convolutions of a sheet of said elastomeric foam;
   f. at least said two outer convolutions being bonded to each other by a line of cement extending substantially from one end of said body to the other;
   g. said end plates being bonded to the ends of said body by cement;
   h. said elastomeric foam being composed of a material that is selected from the class consisting of urethane polymers and vinyl polymers and has a 25 percent indication load deflection value in the range of 1 to 200 pounds-force per 50 square inches.

* * * * *